(12) United States Patent
Key

(10) Patent No.: US 8,739,457 B1
(45) Date of Patent: Jun. 3, 2014

(54) ANIMAL ATTRACTING APPARATUS AND METHOD OF USE

(71) Applicant: Michael D. Key, Dora, AL (US)

(72) Inventor: Michael D. Key, Dora, AL (US)

(*) Notice: Subject to any disclaimer, the term of this patent is extended or adjusted under 35 U.S.C. 154(b) by 0 days.

(21) Appl. No.: 14/132,466

(22) Filed: Dec. 18, 2013

(51) Int. Cl.
*A01M 31/06* (2006.01)

(52) U.S. Cl.
USPC ........................................... 43/2; 43/1

(58) Field of Classification Search
CPC ..... A01M 31/04; A01M 31/06; A01M 31/00; A01M 31/002; A01M 31/008
USPC ......................................... 43/1, 2, 3; 446/475
See application file for complete search history.

(56) References Cited

U.S. PATENT DOCUMENTS

| | | | |
|---|---|---|---|
| 4,044,720 A * | 8/1977 | Fast ............................. | 119/223 |
| 4,890,571 A | 1/1990 | Gaskill | |
| 5,029,408 A * | 7/1991 | Smith ............................ | 43/1 |
| 5,555,664 A | 9/1996 | Shockley | |
| 6,053,793 A * | 4/2000 | Green ........................... | 446/192 |
| 6,484,431 B2 | 11/2002 | Price, Sr. et al. | |
| 7,441,365 B2 | 10/2008 | Brunner et al. | |
| 8,387,301 B2 | 3/2013 | Williams, Sr. | |
| 2013/0104443 A1 | 5/2013 | Cramer | |

* cited by examiner

*Primary Examiner* — David Parsley
*Assistant Examiner* — Marc Burgess
(74) *Attorney, Agent, or Firm* — Bush Intellectual Property Law; Kenneth M. Bush

(57) ABSTRACT

An animal attracting apparatus comprising a water source, a collection tube pivotable vertically between an upwardly disposed first position and a downwardly disposed second position, and a rotatable shaft attached to the collection tube for concomitant rotation therewith. Animal attractant devices are mounted to the shaft for concomitant rotation therewith. In operation, water gravity flows from the water source into the collection tube. After water in the collection tube reaches a predetermined level, the collection tube pivots from the first position to the second position and dispenses water from the collection tube. After water in the collection tube is dispensed, the collection tube pivots from the second position back to the first position to be refilled by water. As the collection tube pivots, the collection tube rotates the shaft. As the shaft rotates, the animal attractant devices are actuated to emit animal attractants.

23 Claims, 6 Drawing Sheets

ANIMAL ATTRACTING APPARATUS AND METHOD OF USE

FIELD OF THE INVENTION

The present invention is directed to animal attracting devices and, more particularly, to a non-electronic, water-operated apparatus that attracts animals for wildlife management purposes.

BACKGROUND OF THE INVENTION

In wildlife management, it sometimes becomes necessary to remove animals from particular locations. This may occur, for example, in urban and residential areas where predator animals (e.g. coyotes) have encroached. To achieve this end, hunters or trappers may be utilized to either kill or trap and relocate unwanted animals.

A number of animal attracting devices have been developed to lure an animal to a hunter or animal trap. These devices are typically designed to be manually operated by a user. These manually-operated devices can be problematic because the operator may want to set the attracting device and leave it for a period of time, or the operator may not want to lure a predator animal in proximity to the operator. Also, most predators have heightened senses (e.g. sight, smell, hearing) and can typically detect human presence before coming into proximity to an attracting device, which may scare away the animals. To overcome these problems, animal attracting devices have been developed that are operable to function without the operator present or that can be remotely operated, either of which allow the operator to be at a substantial distance from the attracting device. These devices are particularly useful with trappers attempting to lure an animal into an animal trap. However, these devices are typically electronic (e.g. battery-operated) and many jurisdictions prohibit the use of electronic devices to lure animals for hunting or trapping purposes.

Accordingly, what is needed is a continually-operating, non-electronic animal attracting apparatus that is operable to attract an animal to an animal trap without the presence of an operator, thus allowing the operator to leave the apparatus unattended for prolonged periods of time.

SUMMARY OF THE INVENTION

The present invention comprises an animal attracting apparatus and its method of use. The apparatus is operated by constant water flow, similar to a "Shishi Odoshi" water fountain. The apparatus comprises a water collection tube pivoted to one side of its balance point. At rest, its heavier end is down. A trickle of water into the upper end of the tube accumulates and eventually moves the tube's center of gravity past the pivot, causing the tube to rotate and dump out the water. As the collection tube pivots, it rotates a shaft which actuates animal attracting devices to emit animal attractants.

The apparatus preferably comprises a water source and a water receptacle. A water flow tube has an inlet for receiving water from the water source and an outlet for dispensing water from the flow tube. The flow tube inlet is secured to the bottom of the water source and the outlet is positioned below the inlet so that water is disposed to gravitationally flow through the flow tube and out of the outlet. A frame assembly preferably has a plurality of vertical support members and a collection tube stop member. A shaft is rotatably mounted to the vertical support members, wherein the shaft is rotatable along its axis in a horizontal plane. The rotatable shaft has a front end, an opposing rear end, and a central section. A water collection tube is preferably affixed to the central section of the shaft for concomitant rotation therewith, wherein the collection tube is pivotable in a vertical plane. The collection tube preferably has an upper portion with an open upper end and a lower portion with a closed lower end. The collection tube open upper end is upwardly biased and the closed lower end is downwardly biased. The collection tube is operable to pivot between an upwardly disposed first position and a downwardly disposed second position. The collection tube open upper end is positioned immediately subjacent the flow tube outlet to receive water therefrom and the lower portion is in abutment with the stop member when the collection tube is in the first position. The collection tube open upper end is positioned above the water receptacle to dispense water therein and the upper portion is in abutment with the stop member when the collection tube is in the second position. A first gravity operated game call is preferably mounted to the front end of the shaft for concomitant rotation therewith and a second gravity operated game call is preferably mounted to the rear end of the shaft for concomitant rotation therewith. A scent dispenser is preferably mounted to the front end of the shaft for concomitant rotation therewith and a visual attractant is preferably mounted to the rear end of the shaft for concomitant rotation therewith.

In operation, water from the water source gravity flows through the water flow tube and into the open upper end of the collection tube. After water in the collection tube reaches a predetermined level, the collection tube pivots from the upwardly disposed first position into the downwardly disposed second position and dispenses water into the water receptacle. After water in the collection tube is dispensed into the water receptacle, the collection tube pivots from the downwardly disposed second position back into the upwardly disposed first position to be refilled by water. As the collection tube pivots from the first position to the second position and from the second position to the first position, the collection tube rotates the shaft. As the shaft rotates, the first and second gravity operated game calls emit an animal attracting sound, the scent dispenser emits an animal attracting scent, and the visual attractant produces animal attracting visual signals. This cycle will continue repeating until the water in the water source is exhausted. Collected water in the water receptacle can be poured into the water source or the water receptacle and water source can be exchanged by the operator.

These and other features of the invention will become apparent from the following detailed description of the invention.

DETAILED DESCRIPTION OF THE INVENTION

Figure 1:
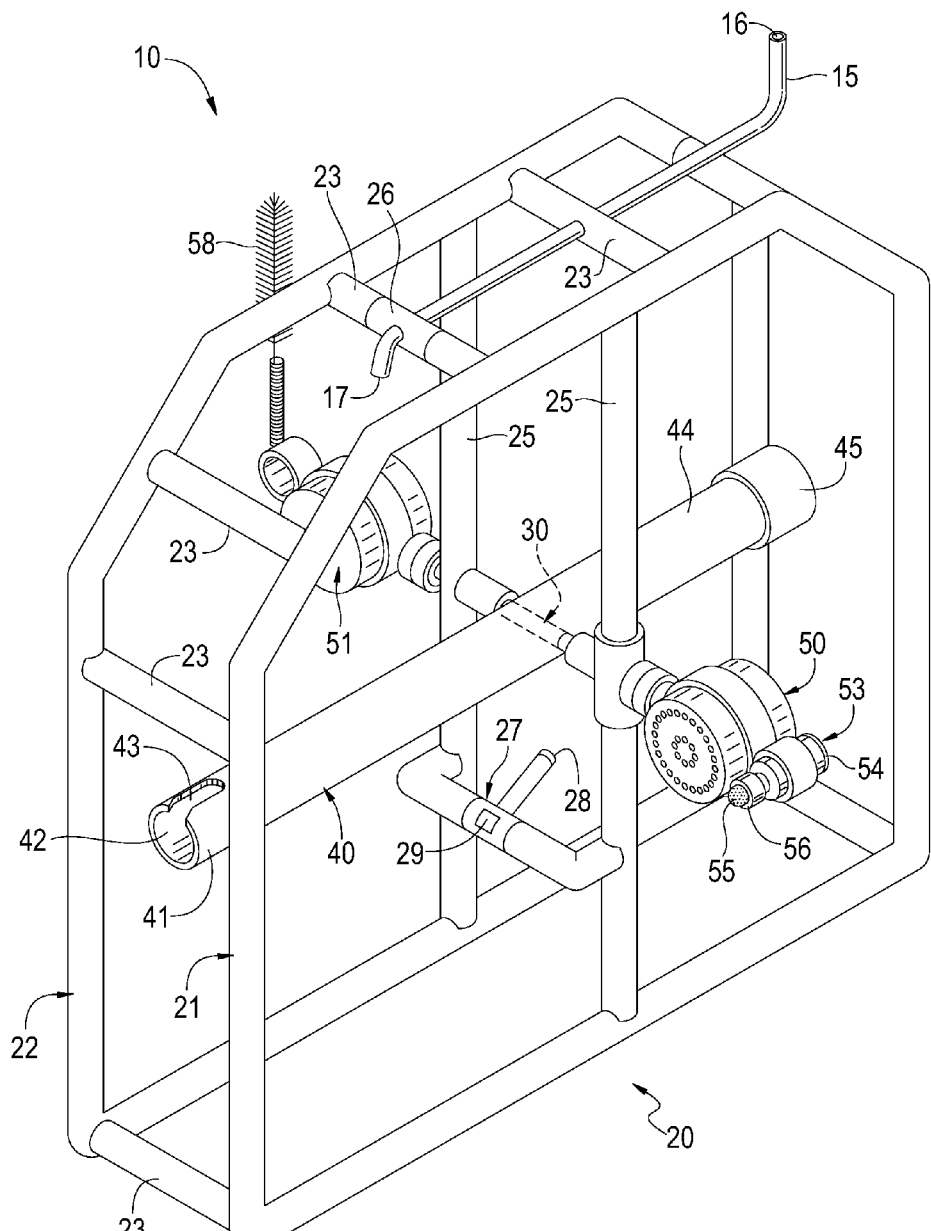
FIG. 1 is a front perspective view of the invention with the collection tube horizontally disposed.

The animal attracting apparatus 10, shown in FIGS. 1-6, preferably comprises a water source 11 and a water receptacle 12. A water flow tube 15 has an inlet 16 for receiving water from the water source 11 and an outlet 17 for dispensing water from the flow tube 15. The flow tube inlet 16 is secured to the bottom of the water source 11 and the outlet 17 is positioned below the inlet 16 so that water is disposed to gravitationally flow through the flow tube 15 and out of the outlet 17. A valve 18 is preferably operably connected to the flow tube 15 for controlling water flow through the flow tube 15 and the rate of water flow. A frame assembly 20 preferably has a front frame member 21, a rear frame member 22, a plurality of connecting frame members 23, a plurality of vertical support members 25, a rotatable member 26 having the flow tube outlet 17 secured thereto, and a collection tube stop member 27 having a first stop 28 and a second stop 29. A shaft 30 is rotatably mounted to the vertical support members 25, wherein the shaft 30 is rotatable along its axis in a horizontal plane. The rotatable shaft 30 has a front end 31 having a front housing 32 secured thereto for attachment of animal attracting devices, an opposing rear end 33 having a rear housing 34 secured thereto for attachment of animal attracting devices, and a central section 35. A detachable front coupling mechanism 36 preferably secures the shaft front end 31 to the front housing 32 and a detachable rear coupling mechanism 37 preferably secures the shaft rear end 33 to the rear housing 34.

Figure 2:
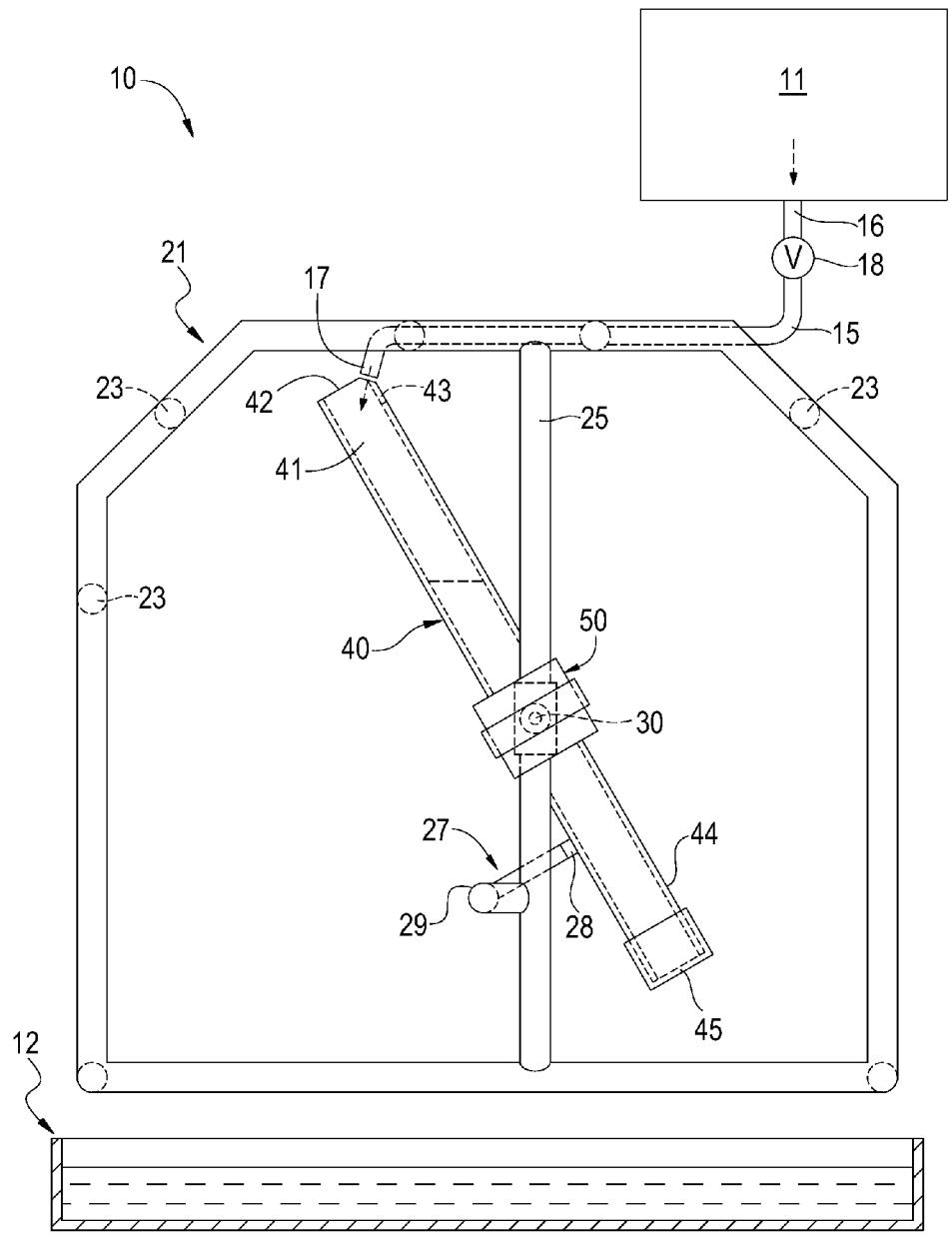
FIG. 2 is a front elevation view of the invention with the collection tube upwardly disposed.
Figure 3:
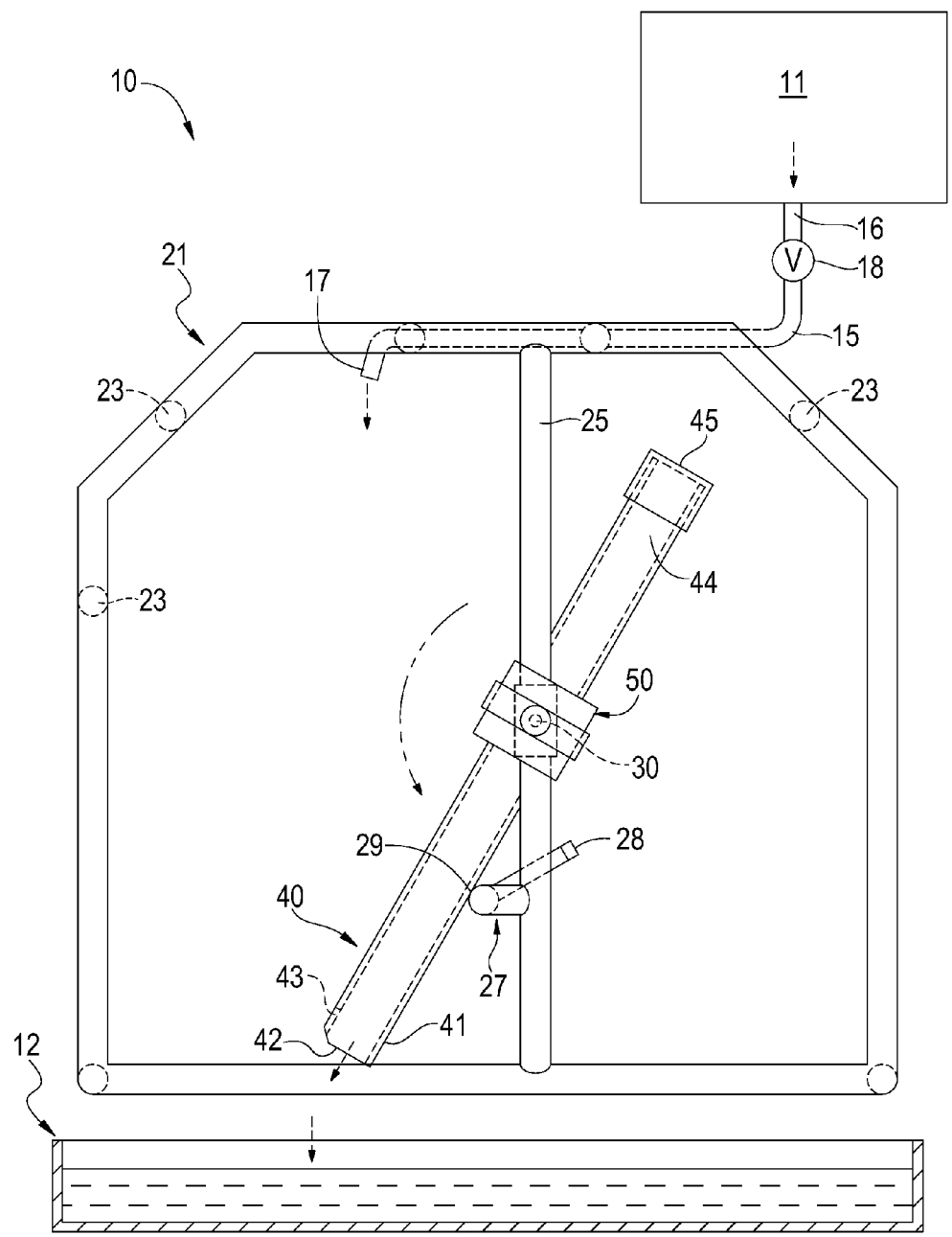
FIG. 3 is a front elevation view of the invention with the collection tube downwardly disposed.
Figure 4:
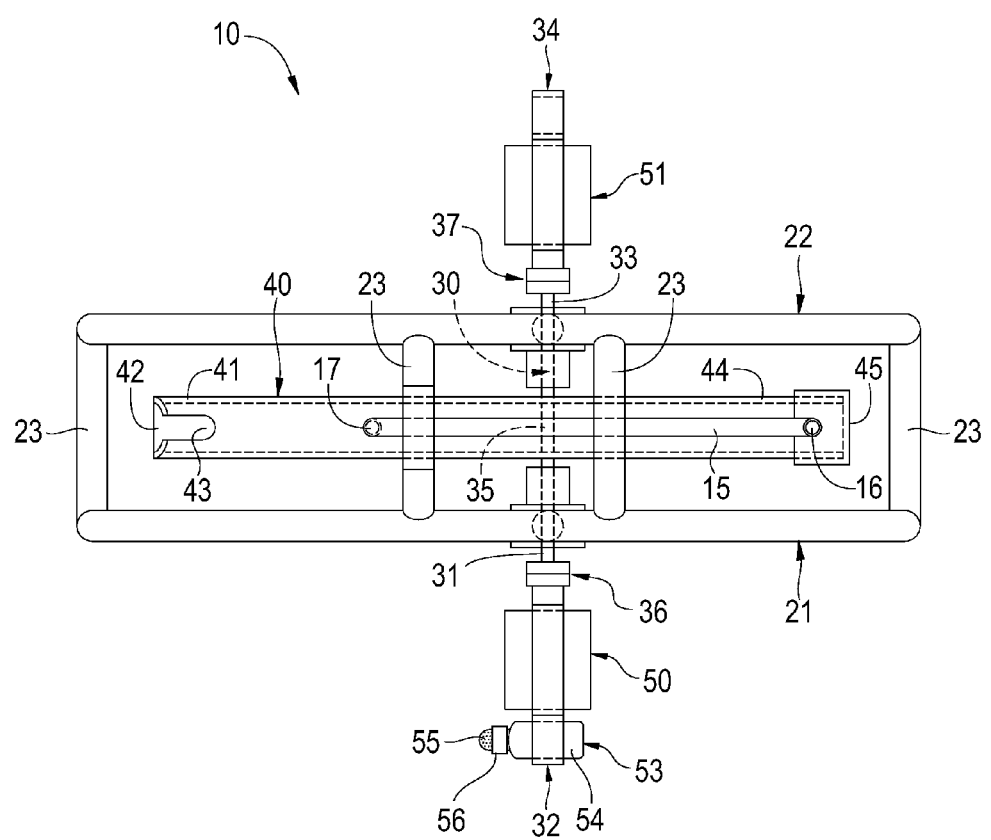
FIG. 4 is a top plan view of the invention with the collection tube horizontally disposed.
Figure 5:
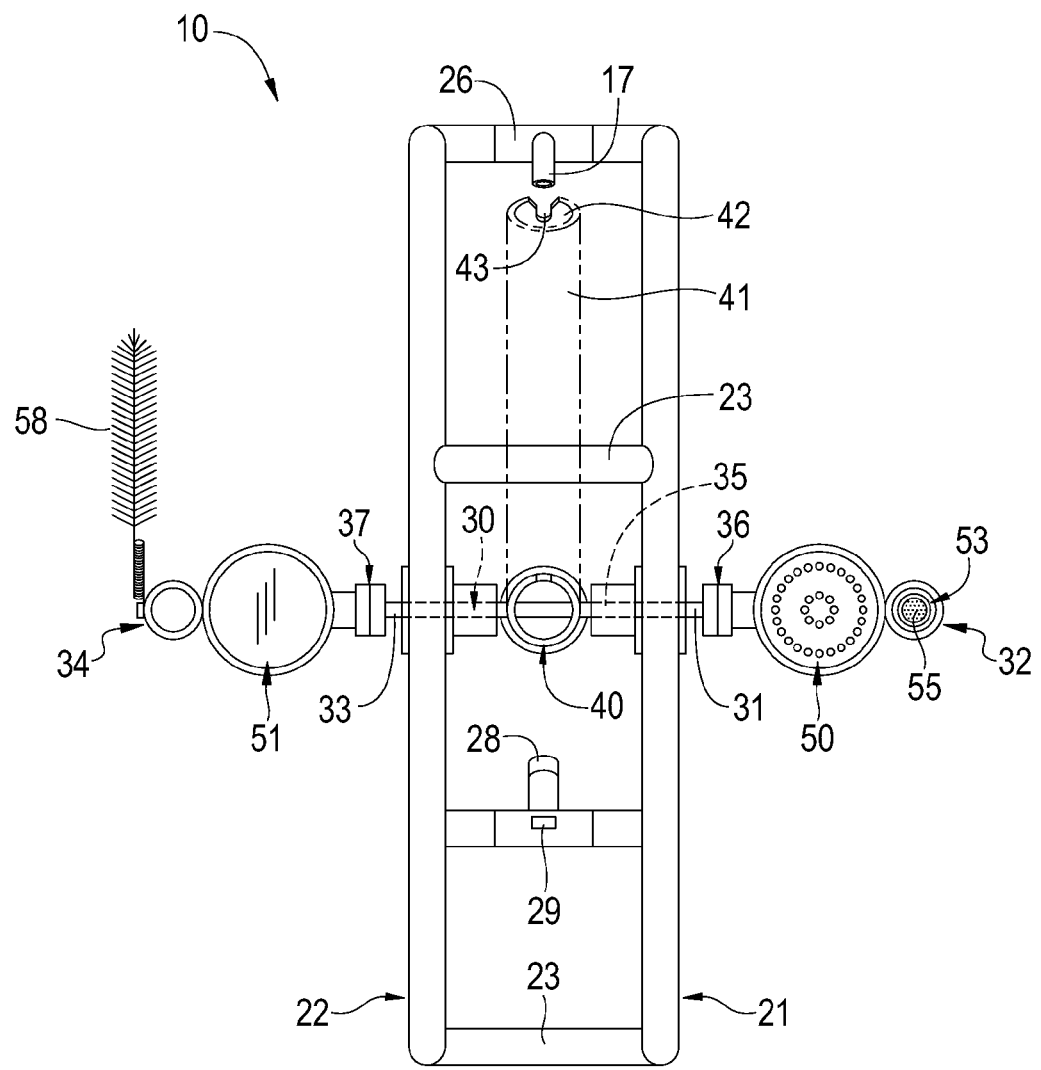
FIG. 5 is a left side elevation view of the invention with the collection tube shown horizontally disposed and upwardly disposed in phantom.
Figure 6:
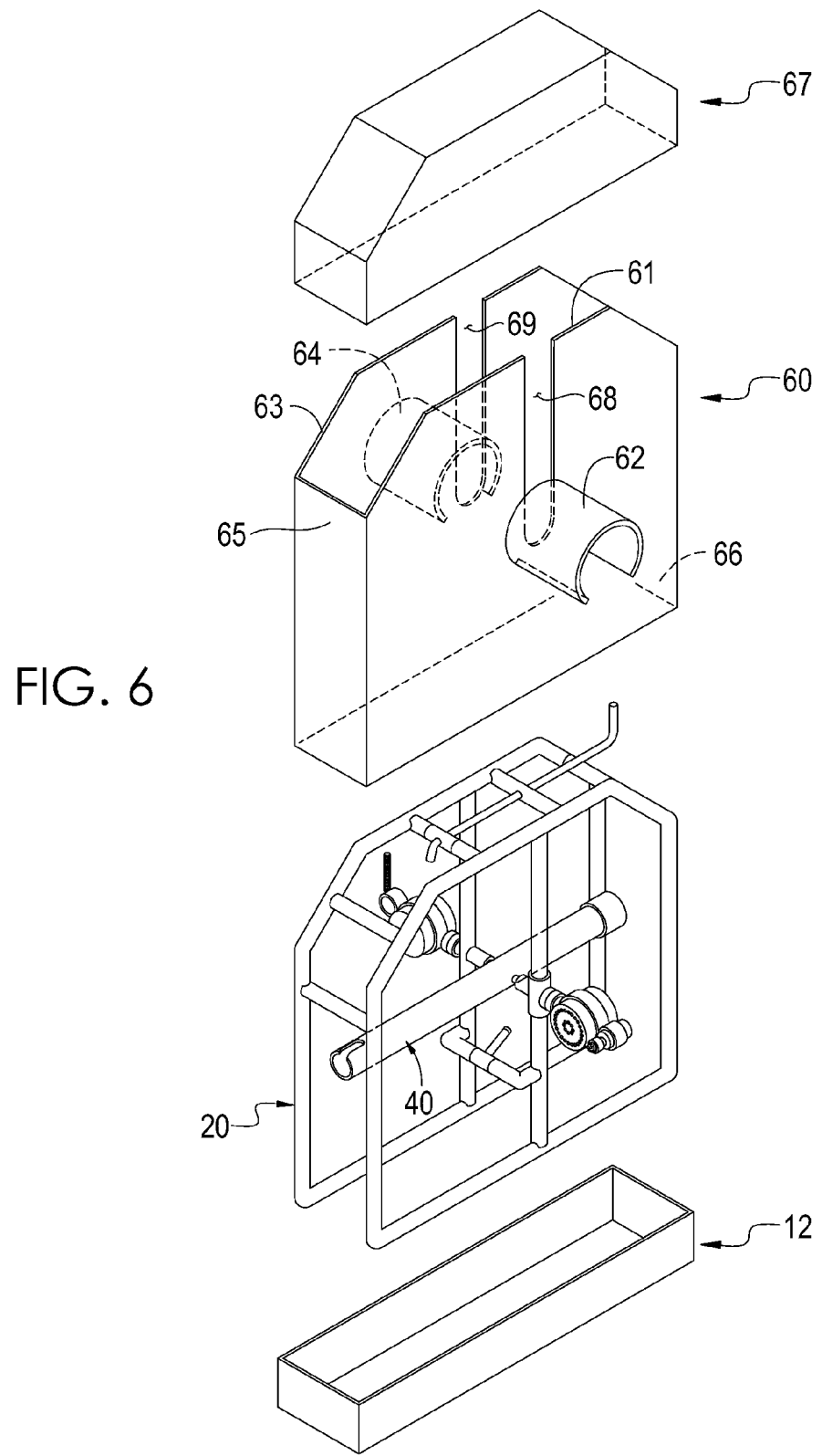
FIG. 6 is an exploded front perspective view of the invention with a protective housing.

A water collection tube 40 is preferably affixed to the central section 35 of the shaft 30 for concomitant rotation therewith, wherein the collection tube 40 is pivotable in a vertical plane. The collection tube 40 preferably has an upper portion 41 with an open upper end 42, a slot 43 contiguous with the open upper end 42, and a lower portion 44 with a closed lower end 45. The open upper end 42 is upwardly biased and the closed lower end 45 is downwardly biased. The collection tube 40 is operable to pivot along a horizontal pivot point corresponding to shaft 30 between an upwardly disposed first position (FIG. 2) and a downwardly disposed second position (FIG. 3). The open upper end 42 is positioned immediately subjacent the flow tube outlet 17 to receive water therefrom and the lower portion 44 is in abutment with the first stop 28 of stop member 27 when the collection tube 40 is in the first position (FIG. 2). The open upper end 42 is positioned above the water receptacle 12 to dispense water therein and the upper portion 41 is in abutment with the second stop 29 of stop member 27 when the collection tube 40 is in the second position (FIG. 3). The collection tube 40 has a pivot range less than 180 degrees, and preferably about 140 degrees.

A first gravity operated game call 50 is preferably mounted to the front end 31 of the shaft 30 for concomitant rotation therewith and a second gravity operated game call 51 is preferably mounted to the rear end 33 of the shaft 30 for concomitant rotation therewith. Gravity operated game calls are well known in the prior art and, therefore, their function is not described herein. A scent dispenser 53 is preferably mounted to the front end 31 of the shaft 30 for concomitant rotation therewith. The scent dispenser 53 preferably includes an open-ended container 54, a wick 55 mounted within the open end 56 of the open-ended container 54, and a scented liquid in the container 54. A visual attractant 58 is preferably mounted to the rear end 33 of the shaft 30 for concomitant rotation therewith.

In operation, the water source 11 is filled with water. The water flow valve 18 is adjusted to allow water to gravity flow from the water source 11 into and through the water flow tube 15. The valve 18 can be adjusted to control the rate of water flow through the flow tube 15. The flow tube 15 is operable to dispense water into the open upper end 42 of the collection tube 40. The rotatable member 26 can be rotated to vertically align the flow tube outlet 17 with the open upper end 42 of the collection tube 40. As water in the collection tube 40 reaches a predetermined level, the collection tube 40 will begin to pivot. The open upper end 42 will pivot out of vertical alignment with the outlet 17. The slot 43 allows water from the outlet 17 to continue filling the collection tube 40 to promote continued pivoting of the collection tube 40. The collection tube 40 pivots from the upwardly disposed first position (FIG. 2) into the downwardly disposed second position (FIG. 3) and dispenses water into the water receptacle 12. After water in the collection tube 40 is dispensed into the water receptacle 12, the collection tube 40 pivots from the downwardly disposed second position (FIG. 3) back into the upwardly disposed first position (FIG. 2) to be refilled by water. As the collection tube 40 pivots from the first position to the second position and from the second position to the first position, the collection tube 40 rotates the shaft 30. As the shaft 30 rotates, the first gravity operated game call 50 emits an animal attracting sound as the collection tube 40 pivots from the first position to the second position and the second gravity operated game call 51 emits an animal attracting sound as the collection tube 40 pivots from the second position to the first position. As the shaft 30 rotates, the scent dispenser 53 emits an animal attracting scent and the visual attractant 58 produces animal attracting visual signals to attract those animals curious to movement and/or light reflection. As the scent dispenser 53 is cycled and the container 54 is pivoted with the collection tube 40 into the second position (FIG. 3), the liquid scent wets the wick 55 and thereby renews the desired scent. This keeps fresh lure scent in the air with no spillage or need for hands on reapplication. The foregoing cycle will continue repeating until the water in the water source 11 is exhausted. Collected water in the water receptacle 12 can be poured back into the water source 11 or the water receptacle 12 and water source 11 can be exchanged by the operator. Thus, the collected water can be recycled.

The apparatus may include a protective housing 60 (FIG. 6) preferably comprising a front panel 61 with a front arcuate cover 62 extending horizontally therefrom, a rear panel 63 with a rear arcuate cover 64 extending horizontally therefrom, a left side panel 65, a right side panel 66, and a top cover 67. The front panel 61 preferably has an open ended vertical slot 68 for receiving the front end 31 of the shaft 30 therein and the rear panel 63 preferably has an open ended vertical slot 69 for receiving the rear end 33 of the shaft 30 therein. The front arcuate cover 62 is operable to cover the front attractant housing 32 and the animal attractants mounted thereto, and the rear arcuate cover 64 is operable to cover the rear attractant housing 34 and the animal attractants mounted thereto. The arcuate covers 62, 64 are preferably reversibly attachable to the front and rear panels 61, 63, respectively, to allow the frame assembly 20 to be reversibly insertable within the housing 60 without interference between the animal attractant devices (e.g. 50, 51, 53, 58) and the arcuate covers 62, 64. The protective housing 60 will not interfere with the operation of the apparatus 10. The top cover 67 may include a slot or hole to accommodate the water flow tube 15. The protective housing 60 can nest on top of the water receptacle 12 or have a bottom with a drain hole that allows water to drain into the water receptacle 12.

The present invention uses only the weight and dispersal of water to operate and reset, making it environmentally safe and friendly. No electronics or petroleum fuels are used. The apparatus is timed for operation by the amount of water flow used to complete and reset a cycle. The operation cycle can be adjusted from a few seconds to 30 minutes or more by increasing or decreasing the amount of water flowing into the collection tube 40 and/or by changing the amount of water required to pivot the collection tube 40. The apparatus allows wildlife observers, trappers, or others to lure animals into an area for observation, video surveillance, trapping, or the like without being present except to set up the apparatus or recharge the water source 11 with water.

While the invention has been shown and described in some detail with reference to specific exemplary embodiments, there is no intention that the invention be limited to such detail. On the contrary, the invention is intended to include any alternative or equivalent embodiments that fall within the spirit and scope of the invention as described and claimed herein. For example, the collection tube 40 and rotatable shaft 30 can be supported by a single vertical support 25 member, and any number or variation of animal attractant devices (e.g. 50, 53, 58) can be attached to the rotatable shaft 30. Also, the water receptacle 12 is not necessary for the operation of the apparatus, and running water from a stream or the like can be used as the water source 11.

The invention claimed is:

1. An animal attracting apparatus, comprising:
   a) a water source;
   b) a frame assembly having a plurality of vertical support members;
   c) a shaft rotatably mounted to said vertical support members, wherein said shaft is rotatable along its axis in a horizontal plane, wherein said shaft has a first end, an opposing second end, and a central section;
   d) a water collection tube affixed to said central section of said shaft for concomitant rotation therewith, wherein said collection tube is pivotable in a vertical plane, wherein said collection tube has an upper portion with an open upper end and a lower portion with a closed lower end, wherein said open upper end is upwardly biased and said closed lower end is downwardly biased;
   e) a first gravity operated game call mounted to said first end of said shaft for concomitant rotation therewith;
   f) a second gravity operated game call mounted to said second end of said shaft for concomitant rotation therewith;
   g) a scent dispenser mounted to said first end of said shaft for concomitant rotation therewith; and
   h) a visual attractant mounted to said second end of said shaft for concomitant rotation therewith;
   i) wherein said collection tube is operable to pivot between an upwardly disposed first position and a downwardly disposed second position, wherein said open upper end is positioned below said water source to receive water therefrom when said collection tube is in said first position;
   j) wherein said water source is operable to dispense water into said open upper end of said collection tube when said collection tube is in said first position, wherein said collection tube is operable to pivot from said first position into said second position when water in said collection tube reaches a predetermined level, wherein said collection tube is operable to dispense water therefrom when said collection tube is in said second position, wherein said collection tube is operable to pivot from said second position back into said first position after water in said collection tube is dispensed therefrom, wherein said collection tube is operable to rotate said shaft as said collection tube pivots from said first position to said second position and from said second position to said first position;
   k) wherein said first gravity operated game call is operable to emit an animal attracting sound when said shaft rotates as said collection tube pivots from said first position to said second position, wherein said second gravity operated game call is operable to emit an animal attracting sound when said shaft rotates as said collection tube pivots from said second position to said first position;
   l) wherein said scent dispenser is operable to emit an animal attracting scent when said shaft rotates; and
   m) wherein said visual attractant is operable to produce animal attracting visual signals when said shaft rotates.

2. An apparatus according to claim 1, further comprising a water flow tube having an inlet for receiving water from said water source and an outlet for dispensing water from said water flow tube, wherein said inlet is secured to said water source and said outlet is located below said inlet so that water is disposed to gravitationally flow through said water flow tube and out of said outlet, wherein said water flow tube is operable to dispense water from said water source into said open upper end of said collection tube when said collection tube is in said first position.

3. An apparatus according to claim 2, further comprising a valve operably connected to said water flow tube for controlling water flow through said water flow tube.

4. An apparatus according to claim 1, further comprising a water receptacle for receiving water dispensed from said collection tube, wherein said open upper end of said collection tube is positioned above said water receptacle to dispense water therein when said collection tube is in said second position.

5. An apparatus according to claim 2, wherein said frame assembly further comprises a rotatable member having said outlet secured thereto.

6. An apparatus according to claim 1, wherein said frame assembly further comprises a rotatable member having a collection tube stop member, wherein said lower portion of said collection tube is in abutment with said stop member when said collection tube is in said first position, wherein said upper portion of said collection tube is in abutment with said stop member when said collection tube is in said second position.

7. An apparatus according to claim 1, wherein said water collection tube further comprises a slot contiguous with said open upper end.

8. An apparatus according to claim 1, wherein said scent dispenser comprises an open-ended container, a wick mounted within the open end of said open-ended container, and a liquid scent in said container.

9. An apparatus according to claim 1, wherein said apparatus further comprises a protective housing having a front panel with a first arcuate cover extending horizontally therefrom, a rear panel with a second arcuate cover extending horizontally therefrom, a left side panel, a right side panel, and a top cover, wherein said front panel has an open ended vertical slot for receiving said first end of said shaft therein and said rear panel has an open ended vertical slot for receiving said second end of said shaft therein, wherein said first arcuate cover is operable to cover said first gravity operated game call and said scent dispenser, wherein said second arcuate cover is operable to cover said second gravity operated game call and said visual attractant.

10. An animal attracting apparatus, comprising:
    a) a water source;
    b) a vertical support member;
    c) a shaft rotatably mounted to said vertical support member, wherein said shaft is rotatable along its axis in a horizontal plane;
    d) a water collection tube affixed to said shaft for concomitant rotation therewith, wherein said collection tube is pivotable in a vertical plane, wherein said collection tube has an upper portion with an open upper end and a lower portion with a closed lower end, wherein said open upper end is upwardly biased and said closed lower end is downwardly biased; and e) at least one animal attracting device mounted to said shaft for concomitant rotation therewith;

f) wherein said collection tube is operable to pivot between an upwardly disposed first position and a downwardly disposed second position, wherein said open upper end is positioned below said water source to receive water therefrom when said collection tube is in said first position;

g) wherein said water source is operable to dispense water into said open upper end of said collection tube when said collection tube is in said first position, wherein said collection tube is operable to pivot from said first position into said second position when water in said collection tube reaches a predetermined level, wherein said collection tube is operable to dispense water therefrom through said open upper end when said collection tube is in said second position, wherein said collection tube is operable to pivot from said second position back into said first position after water in said collection tube is dispensed therefrom, wherein said collection tube is operable to rotate said shaft as said collection tube pivots from said first position to said second position and from said second position to said first position;

h) wherein said at least one animal attracting device is operable to emit animal attractants when said shaft rotates.

11. An apparatus according to claim 10, further comprising a water flow tube having an inlet for receiving water from said water source and an outlet for dispensing water from said water flow tube, wherein said inlet is secured to said water source and said outlet is located below said inlet so that water is disposed to gravitationally flow through said water flow tube and out of said outlet, wherein said water flow tube is operable to dispense water from said water source into said open upper end of said collection tube when said collection tube is in said first position.

12. An apparatus according to claim 10, further comprising a water receptacle for receiving water dispensed from said collection tube, wherein said open upper end of said collection tube is positioned above said water receptacle to dispense water therein when said collection tube is in said second position.

13. An apparatus according to claim 10, wherein said vertical support member comprises a collection tube stop member, wherein said lower portion of said collection tube is in abutment with said stop member when said collection tube is in said first position, wherein said upper portion of said collection tube is in abutment with said stop member when said collection tube is in said second position.

14. An apparatus according to claim 10, wherein said at least one animal attracting device comprises a first gravity operated game call mounted to said shaft for concomitant rotation therewith, wherein said first gravity operated game call is operable to emit an animal attracting sound when said shaft rotates as said collection tube pivots from said first position to said second position.

15. An apparatus according to claim 14, wherein said at least one animal attracting device further comprises a second gravity operated game call mounted to said shaft for concomitant rotation therewith, wherein said second gravity operated game call is operable to emit an animal attracting sound when said shaft rotates as said collection tube pivots from said second position to said first position.

16. An apparatus according to claim 10, wherein said at least one animal attracting device comprises a scent dispenser mounted to said shaft for concomitant rotation therewith, wherein said scent dispenser is operable to emit an animal attracting scent when said shaft rotates.

17. An apparatus according to claim 10, wherein said at least one animal attracting device comprises a visual attractant mounted to said shaft for concomitant rotation therewith, wherein said visual attractant is operable to produce animal attracting visual signals when said shaft rotates.

18. A method of attracting an animal, comprising the steps of:

1) gravity feeding water from a water source into an animal attracting apparatus to actuate said animal attracting apparatus, wherein said animal attracting apparatus comprises:
   a) a shaft rotatably mounted to a support member, wherein said shaft is rotatable along its axis in a horizontal plane;
   b) a collection tube affixed to said shaft for concomitant rotation therewith, wherein said collection tube is pivotable in a vertical plane; and
   c) at least one animal attracting device mounted to said shaft for concomitant rotation therewith;
   d) wherein said collection tube has an upper portion with an open upper end and a lower portion with a closed lower end wherein said open upper end is upwardly biased and said closed lower end is downwardly biased;
   e) wherein said collection tube is operable to pivot between an upwardly disposed first position and a downwardly disposed second position, wherein said open upper end is positioned to receive water from said water source when said collection tube is in said first position;

2) pivoting said collection tube from said first position into said second position after water in said collection tube reaches a predetermined level, wherein said collection tube is operable to rotate said shaft as said collection tube pivots from said first position to said second position;

3) dispensing water from said open upper end of said collection tube when said collection tube is in said second position;

4) pivoting said collection tube from said second position into said first position after water in said collection tube is dispensed therefrom, wherein said collection tube is operable to rotate said shaft as said collection tube pivots from said second position to said first position; and 5) emitting an animal attractant from said at least one animal attracting device to attract an animal as said shaft rotates.

19. A method according to claim 18, further comprising the step of collecting water dispensed from said collection tube into a water receptacle.

20. A method according to claim 18, wherein said at least one animal attracting device comprises a first gravity operated game call mounted to said shaft for concomitant rotation therewith, wherein said first gravity operated game call is operable to emit an animal attracting sound when said shaft rotates as said collection tube pivots from said first position to said second position.

21. A method according to claim 20, wherein said at least one animal attracting device further comprises a second gravity operated game call mounted to said shaft for concomitant rotation therewith, wherein said second gravity operated game call is operable to emit an animal attracting sound when said shaft rotates as said collection tube pivots from said second position to said first position.

22. A method according to claim 18, wherein said at least one animal attracting device comprises a scent dispenser mounted to said shaft for concomitant rotation therewith, wherein said scent dispenser is operable to emit an animal attracting scent when said shaft rotates.

23. A method according to claim 18, wherein said at least one animal attracting device comprises a visual attractant mounted to said shaft for concomitant rotation therewith, wherein said visual attractant is operable to produce animal attracting visual signals when said shaft rotates.

* * * * *